United States Patent [19]

Miyajima et al.

[11] Patent Number: 5,298,843
[45] Date of Patent: Mar. 29, 1994

[54] METHOD FOR RESTARTING PUNCH PRESS MACHINE AND NUMERICAL CONTROLLER

[75] Inventors: Keiichiro Miyajima; Naoki Fujita, both of Yamanashi, Japan

[73] Assignee: Fanuc Ltd., Yamanashi, Japan

[21] Appl. No.: 930,395

[22] PCT Filed: Jan. 21, 1992

[86] PCT No.: PCT/JP92/00042
    § 371 Date: Sep. 16, 1992
    § 102(e) Date: Sep. 16, 1992

[87] PCT Pub. No.: WO92/13302
    PCT Pub. Date: Aug. 6, 1992

[30] Foreign Application Priority Data
Jan. 21, 1991 [JP] Japan .................. 3-20455

[51] Int. Cl.⁵ ............... G05B 19/18; G05B 19/405
[52] U.S. Cl. .................... 318/567; 318/569; 318/600; 364/474.03; 364/476
[58] Field of Search .......... 318/567, 568.1, 569, 318/590, 594, 600; 388/907.5; 364/191, 468, 474.01, 474.03, 474.21, 474.22, 474.25, 474.28, 474.32, 474.33, 476

[56] References Cited

U.S. PATENT DOCUMENTS

| 4,201,905 | 5/1980 | Clark et al. |
|---|---|---|
| 4,782,438 | 11/1988 | Mizukado et al. ............ 364/191 |
| 5,067,086 | 11/1991 | Yamazaki et al. ......... 364/474.08 |

FOREIGN PATENT DOCUMENTS

| 0118988 | 9/1984 | European Pat. Off. |
|---|---|---|
| 55-120952 | 9/1980 | Japan . |
| 60-201857 | 10/1985 | Japan . |
| 61-92735 | 5/1986 | Japan . |
| 62-133503 | 6/1987 | Japan . |
| 63-73401 | 4/1988 | Japan . |
| 63-162177 | 7/1988 | Japan . |

OTHER PUBLICATIONS

Patent Abstracts of Japan, vol. 10, No. 369 (P-525)(2426), Dec. 10, 1986, Japan Kokai 61-161513, Jul. 22, 1986.
Patent Abstracts of Japan, vol. 9, No. 44 (P-337)(1767), Feb. 23, 1985, (Japan Kokai 59-184909, Oct. 20, 1984).

*Primary Examiner*—Bentsu Ro
*Attorney, Agent, or Firm*—Nikaido, Marmelstein, Murray & Oram

[57] ABSTRACT

The present invention allows easy restarting of a multiple product machining function in interrupted punch press work. An interrupted machining position is identified with a product number set on a work and a product number of a product for which machine operation is stopped or a product number of a product to be next machined is entered. When this product number is entered, a command program is modified according to a product number entered. The modified program gives machining commands from a work position for a product other than the product for which machine operation is interrupted to a punch press machine.

8 Claims, 3 Drawing Sheets

```
G98   X_ Y_ I_ J_ P2 Q1 ;
U90 ;
G00   X__ Y__ T__ ;
    ⋮
V90 ;
G73   Q1   W90 P3 ;
```

METHOD FOR RESTARTING PUNCH PRESS MACHINE AND NUMERICAL CONTROLLER

FIELD OF THE INVENTION

The present invention relates to a method for restarting an operation of a punch press machine controlled by a numerical controller, and a numerical controller for controlling the punch press machine.

BACKGROUND OF THE INVENTION

In general punch press work, a plurality of replacement punch tools are used to expand machining conditions of the punch press machine. In addition, the punch press machine is arranged to simultaneously machine a plurality of products in the same punch press shape from a sheet of work to raise the machining efficiency of the punch press machine since, particularly, in the case of a small product, a lot of time is required to accurately position the work and feed it to the punch press machine. This is generally called a multiple product machining function. For carrying out multiple product machining by controlling a punch press machine with a numerical controller (NC unit), it is usual to prepare a machining program consisting of a plurality of instructions for machining a sheet of product (product sheet) and instructions to be executed as many times as specified while changing the reference points specified in the above machining program, and store these program and instructions in advance in a memory. When the NC unit is commanded to execute these instructions, the NC unit accesses the machining program as many times as commanded in the program. When the machining program is executed, a machining command for driving the punch head is given to the punch press machine and the specified machining is repeatedly executed on the work in sequence while sequentially moving the work table on which a work is fixed. This type of program for implementing such functions is referred to as a pattern type of program.

However, the operation of the punch press machine may be stopped while the NC unit which controls the punch press machine is executing the program for multiple product machining and giving machining commands to the punch press machine. The operation of the punch press machine is stopped when, for example, drilling is not made as designed because a tool mounted on the punch head is broken. In such a case, it has been difficult for the conventional NC unit having a program restarting function to restart the command program from halfway.

In other words, for restarting machining of a work from halfway, the operator should identify the stop position and change the program in accordance with the above stop position. However, since the multiple product machining program is programmed in a pattern mode having a repetitive loop as described above, a program in the loop must be modified to restart the operation from halfway of the repetitive loop and such modification not only requires a skilled operation but also is a complicated work accompanying the entry of a great deal of data. Accordingly, it takes a lot of time to restart the operation and the operation efficiency of the punch press machine will deteriorate.

In some cases, the machining program is restarted for a new work without changing the program, attaching an importance to the operation efficiency of the punch press machine. In such cases, there has been a problem that all materials in process would be wasted.

SUMMARY OF THE INVENTION

An object of the present invention, which is made in view of the above described points, is to provide a method for restarting an operation of a punch press machine, which is adapted to allow easy restarting of a multiple product machining function and a numerical controller for use in punch press work.

The present invention provides a method for restarting an operation of a punch press machine which is controlled by a numerical controller having a function to repeatedly execute a set of specified machining programs based on different reference points as many times as predetermined and carries out multiple product machining for machining a plurality of products from a work, wherein the numerical controller is provided with a function to recognize an input of product numbers and a function for restarting the above described repetitive execution based on the product number entered when the input of the product number is recognized in the beginning of execution, and the numerical controller is also provided with the step for entering the product numbers into the numerical controller when an operation of the punch press machine is restarted.

The present invention also provides a numerical controller which controls a punch press machine to carry out multiple product machining for machining a plurality of products from a work by repeatedly executing a set of specified machining programs based on different reference points as many times as predetermined and is provided with means for recognizing an input product number and means for restarting the above described repetitive execution in accordance with the product number entered when the input of the product number is recognized in the beginning of execution.

DESCRIPTION OF THE PREFERRED EMBODIMENTS

Figure 1:
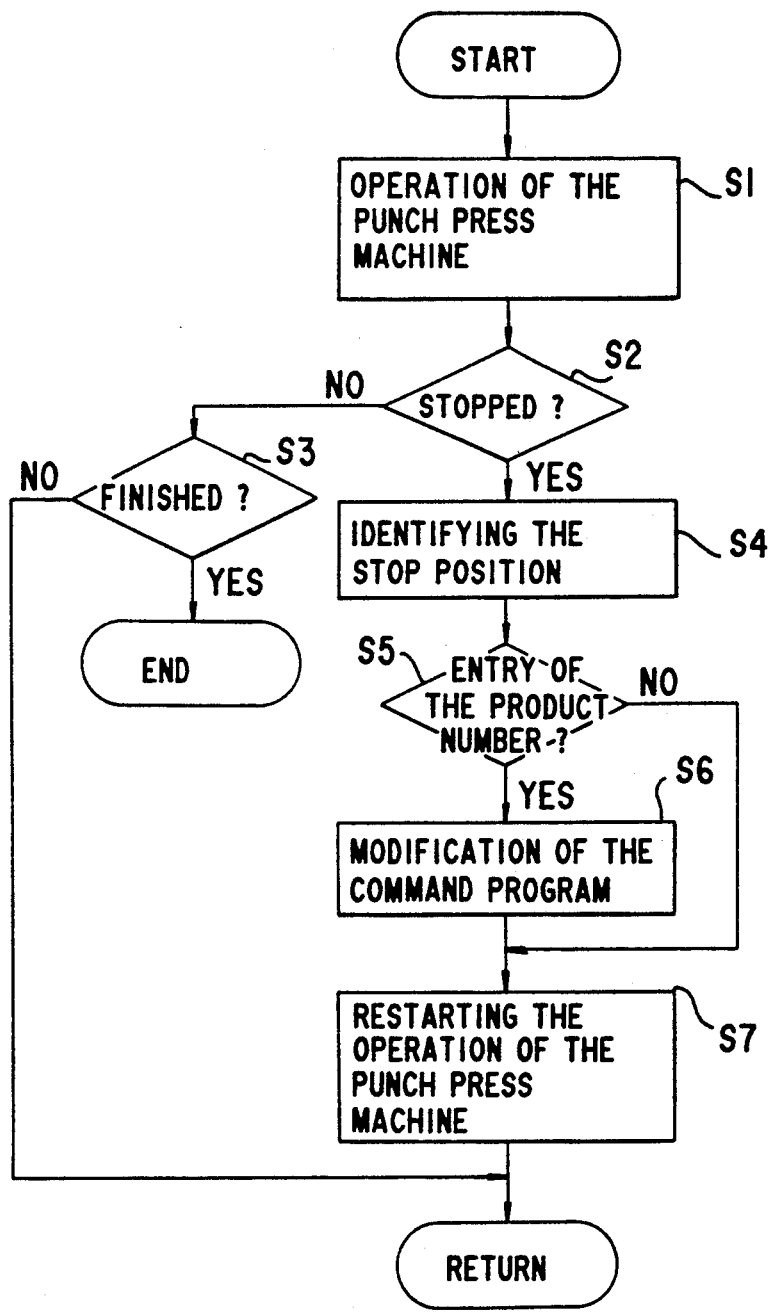
FIG. 1 is a flow chart showing an example of a method for restarting the operation of the punch press work.

An embodiment of the present invention is described below, referring to the drawings.

FIG. 1 is a flow chart showing an example of the method for restarting the punch press machine according to the present invention. In FIG. 1, the numerals following "S" denote the step number.

It is assumed that the punch press machine is carrying out multiple product machining according to the machining commands given by the NC unit. (S1) In this case, the NC unit controls the punch press machine in accordance with a machining program which is programmed in a pattern mode. If an alarm due to, for example, the breakage of a tool mounted on the punch head is generated while the command program for multiple product machining is being carried out, the operation of the punch press machine is stopped.

The NC unit determines whether the operation of the punch press machine is stopped. (S2) When the punch press machine has executed all programmed machining commands or even when the alarm has not been generated, the operator can stop the machine operation as required. (S3) When the machine operation is caused to stop due to the alarm, the stop position is recognized after the cause has been eliminated. (S4) In this case, the machining position where the machine operation has been stopped is identified with the product number defined for the work. In other words, the product number of the product for which the machine operation has been stopped or the product number of a product to be next machined is entered into the NC unit. (S5) The command program is modified according to the product number entered. (S6) The NC unit which executes the modified program gives a machining command from a position of a work for a product different from the product for which the machine operation has been stopped and the operation is restarted. (S7)

Figures 2, 3:
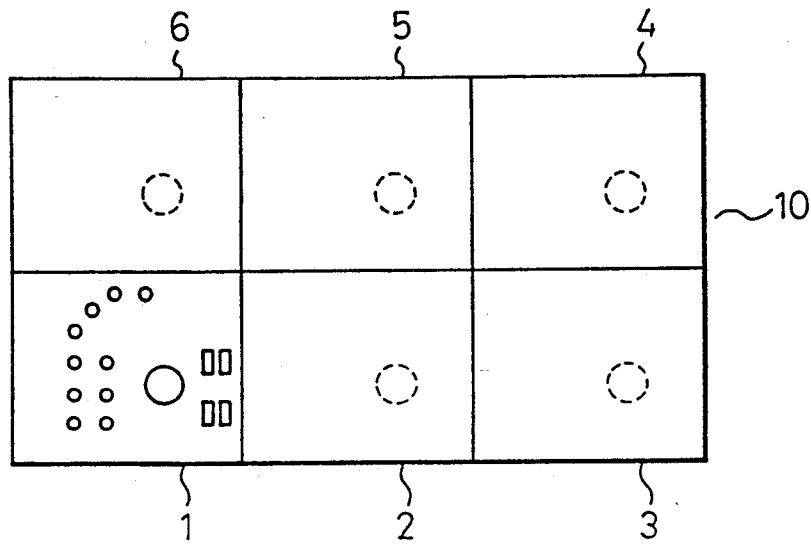
FIG. 2 is a diagram illustrating multiple product machining from a sheet of work.
FIG. 3 is a diagram showing an example of a command program for multiple product machining.

FIG. 2 shows a sheet of plate work 10 to be punched by the punch press machine and FIG. 3 shows an example of the command program 7 for multiple product machining.

In FIG. 2, a sheet of plate work 10 is divided into two lines in the longitudinal direction and three rows in the transversal direction and six products in total are machined in the order of product numbers from product 1 to product 6. One product, for example, product 1 is completed by punching one large diameter hole, ten small diameter holes and four square holes.

The command program 7 shown in FIG. 3 comprises the commands for moving the machining position on the work 10 twice in the transversal direction and once in the longitudinal direction according to P2 and Q1 following G code G98 and repeating the same machining operations six times. In the G code G00 instruction and the following instructions, intermediate portions thereof are omitted, and they specify the shape of a product to be machined. The machining shape is stored according to macro instructions U90 and V90. A lower left position of the plate work 10 is defined as the starting position for execution of multiple product machining by Q1 following the G code G73 in the bottom line. In addition, as shown in FIG. 3, a numeral following "P" (3 in the drawing), if entered, is the specified product number for restarting the operation of the punch press machine.

If it is assumed that the machine operation is stopped during machining of product 2 when the punch press work is executed in sequence from product 1 according to the command program 7 for multiple product machining, product 2 is regarded as defective due to interruption of the operation. Then, machining of product 3 and following products should be executed. Therefore, "3" is entered after P following the G code G73 in the bottom line of the command program 7 to allow restarting of the command program 7. Thus, five other products can be obtained without wasting the whole plate work 10.

The above modification of the command program can be temporarily effected by giving a signal input from a switch provided at the machine side to the processor of the NC unit through, for example, the PMC described later. Otherwise the modification of the program can be effected by reading out the machining program and entering "3" in the program.

In case of, for example, first punch-pressing large diameter holes (shown with broken circle lines in the drawing) in all products 1 to 6 and carrying out the other machining after changing the tool to a different tool, the command program must be modified by entering the product number 2 for which the operation has been stopped so that subsequent machining commands for other products except product 2 may be supplied.

These two operation modes can be specified by setting the parameters in the CNC. More specifically, modification to a command program for giving the machining commands from a work position for a product different from the product for which the machine operation has been stopped or a command program for giving machining commands for other products except for the product for which the machine operation has been stopped, can be selected as required by setting the above setting parameters.

Figure 4:
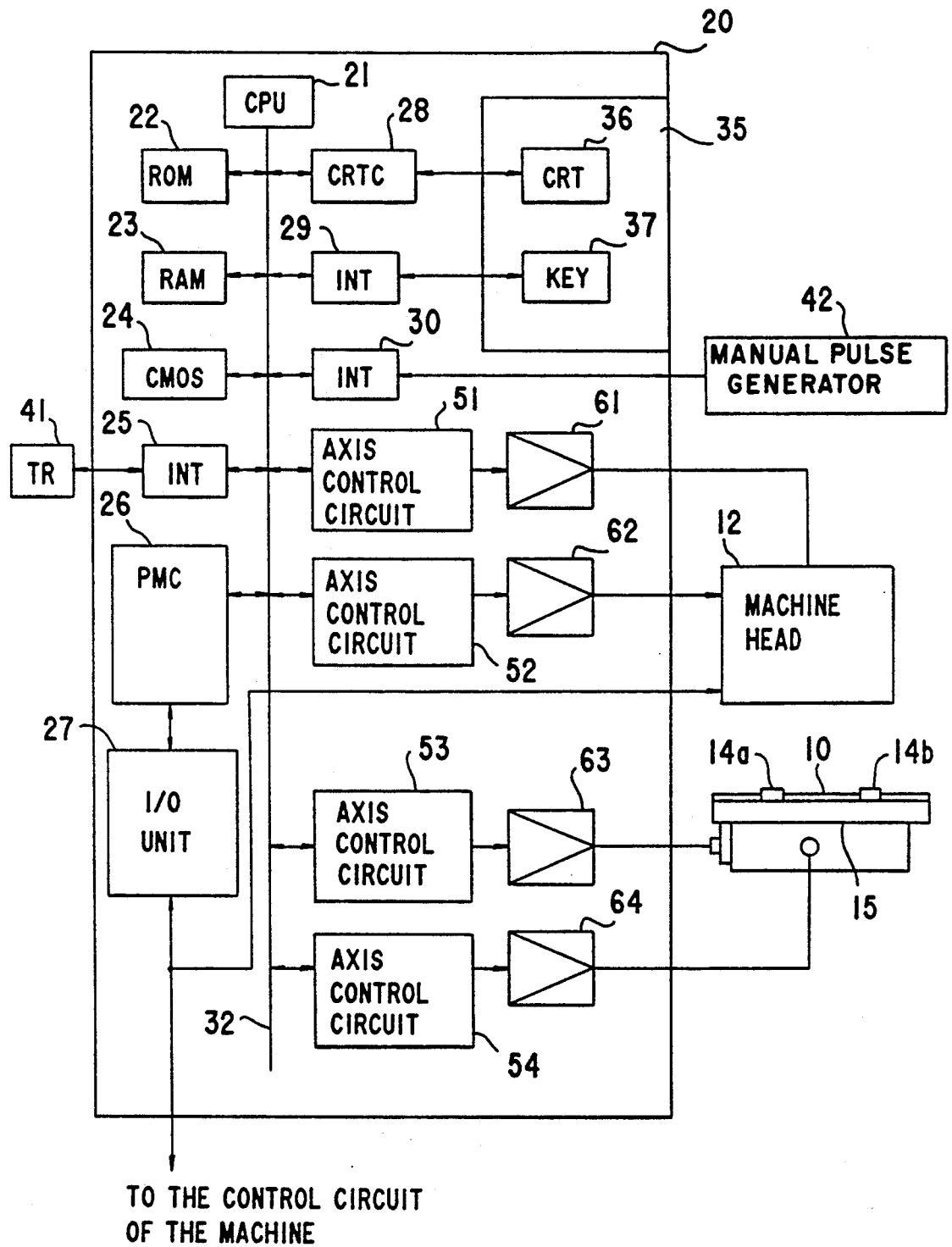
FIG. 4 is a block diagram of the hardware of the NC unit for executing the method according to the present invention.

FIG. 4 is a block diagram of the hardware of the NC unit (CNC) in which the method according to the present invention is embodied. In the drawing, the processor 21 equipped in the CNC 20 is the center of control by the whole CNC 20. This processor 21 reads out a system program stored in the ROM 22 through the bus 32 and the control by the whole CNC 20 is executed according to this system program. Computation data, display data and other data are temporarily stored in the RAM 23. The SRAM (Static RAM) is used as the RAM for this purpose.

The CMOS memory 24 stores the pattern mode command program 7 (FIG. 3), parameters and tool offset values. The CMOS memory 24 is a non-volatile memory backed up by a battery not shown and therefore the data store are retained unchanged even when the power supply of the numerical controller (CNC) 20 is turned off.

An interface 25 is for external equipment and connected to external equipment 41 such as a paper tape reader, paper tape punch, pater tape reader/punch, etc. A machining program is read from the paper tape reader and the machining program edited in the numerical controller (CNC) 20 can be output to the paper tape punch.

A PMC (Programmable Machine Controller) 26 is built into the CNC 20 and controls the machine with a ladder formatted sequence program. More specifically, M, S and T functional commands of the machining program are converted to the signals necessary for the machine according to the sequence program and the signals are output to the machine through the I/0 unit 27. The output signals drive the magnets and other members of the machine to actuate the hydraulic valves, pneumatic valves, electrical actuators and punch heads. The PMC receives the signals from the limit switches of the machine and the switches of the machine operation panel and transfers the signals to the processor 21 after required processing.

A graphic control circuit 28 converts various digital data such as current positions of axes, alarm, parameters, etc., to video signals and outputs these signals. The video signals are transmitted to the display 36 of the CRT/MDI unit 35 and displayed on the display 36. An interface 29 receives the input data such as the product number from the keyboard 37 in the CRT/MDI unit 35 and transfers the data to the processor 21.

An interface 30 is connected to a manual pulse generator 42 and receives the pulses from the manual pulse generator 42. The manual pulse generator 42 is installed on the machine operation panel and is used to manually position with high accuracy the moving components of the machine.

Axis control circuits 51 to 54 receive the axial travel commands from the processor 21 and output the commands as to the axes to the servo amplifiers 61 to 64. The serve amplifier 61 drives the servo motor for the T axis which controls the rotation of the magazine. The machine head 12 includes the magazine 4, punch heads and the like.

A servo amplifier 62 drives a servo motor for the axis C which controls the rotation of the multitool holder. Servo amplifiers 63 and 64 respectively drive the servo motors for the X and Y axes which control the table 15. Work 10 is fixed on the work table 15 with work holders 14a and 14b.

The machine is provided with the switches (not shown) for entering the product number. When the switches are operated, the input data of the product number is entered into the PMC 26 through the I/0 unit 27 and the PMC transfers the data to the CPU 21. The CPU 21 temporarily modifies, as described above, the command program 7 (FIG. 3) so that the product number is entered after the P command following G code G73. The command program can be directly modified with the input through the keyboard 37.

The CPU 21 which operates according to the system program stored in the ROM 22 performs the restarting operation according to a numeral entered after the P command following G code G73. There are two modes of restarting operation which are determined depending on the setting parameters as described above. If the P command is not programmed in the block which follows G73, the CPU 21 determines normal starting of machining and starts the machining from a product specified by the Q command.

We claim:

1. A method of restarting an operation of a punch press machine, which is controlled by a numerical controller having a function to repeatedly execute a set of specified machining programs based on different reference points as many times as specified, to thereby perform multiple product machining for machining a plurality of products from a single work, comprising the steps of:

providing the numerical controller with a function of recognizing designation of a product number;
   providing the numerical controller with a function of restarting the repeated execution in accordance with the designated product number if the designation of the product number has been recognized upon starting of the execution; and
   designating the product number when restarting the operation of the punch press machine.

2. A method as claimed in claim 1, wherein the execution restarting function provided in the numerical controller is a function of restarting the repeated execution from machining of a product of the designated product number.

3. A method as claimed in claim 1, wherein the execution restarting function provided in the numerical controller is a function of restarting the repeated execution for non-designated products determined based on the designated product number.

4. A numerical controller for controlling a punch press machine so as to perform multiple product machining wherein a plurality of products are made from a single work, by repeatedly executing a set of specified machining programs based on different reference points as many times as specified, comprising:

means for recognizing designation of a product number; and
   means for restarting the repeated execution in accordance with the designated product number if the designation of the product number has been recognized upon starting of the execution.

5. A numerical controller as claimed in claim 4, wherein the execution restarting means restarts the repeated execution from machining of a product of the designated product number.

6. A numerical controller as claimed in claim 4, wherein the execution restarting means restarts the repeated execution for non-designated products determined based on the designated product number.

7. A numerical controller as claimed in claim 4, further comprising means for inputting a product number in order to designate the product number.

8. A numerical controller as claimed in claim 4, wherein the product number recognizing means recognizes numbers included in the machining program.

* * * * *